United States Patent
Kim et al.

(10) Patent No.: US 11,458,617 B2
(45) Date of Patent: Oct. 4, 2022

(54) ROBOT DRIVING DEVICE

(71) Applicants: Hyundai Motor Company, Seoul (KR); Kia Motors Corporation, Seoul (KR)

(72) Inventors: Beom Su Kim, Gyeonggi-do (KR); Sang In Park, Gyeonggi-do (KR); Seung Kyu Nam, Seoul (KR); Dong Jin Hyun, Gyeonggi-do (KR); Ju Young Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 175 days.

(21) Appl. No.: 17/081,348

(22) Filed: Oct. 27, 2020

(65) Prior Publication Data
US 2021/0394357 A1   Dec. 23, 2021

(30) Foreign Application Priority Data
Jun. 17, 2020  (KR) .......................... 10-2020-0073826

(51) Int. Cl.
 *B25J 9/12*   (2006.01)
 *B25J 19/00*  (2006.01)
 *B25J 9/00*   (2006.01)

(52) U.S. Cl.
  CPC ............. *B25J 9/126* (2013.01); *B25J 9/0006* (2013.01); *B25J 19/0025* (2013.01)

(58) Field of Classification Search
  CPC ...... B25J 9/104; B25J 19/0025; B25J 9/0006; B25J 9/126
  See application file for complete search history.

(56) References Cited

FOREIGN PATENT DOCUMENTS

| DE | 19747566 C1 | * | 4/1999 | ............ B25J 9/1025 |
| WO | WO-2017192353 A1 | * | 11/2017 | ............ B25J 13/085 |
| WO | WO-2020066431 A1 | * | 4/2020 | ............ B25J 13/088 |

* cited by examiner

*Primary Examiner* — Randell J Krug
(74) *Attorney, Agent, or Firm* — Fox Rothschild LLP

(57) ABSTRACT

A robot driving device includes a base provided at a point spaced apart from a joint part of a robot, a driving part installed to be movable on the base, and for providing a driving force to the joint part, a wire connecting the driving part and the joint part to transfer the driving force of the driving part to the joint part, an adjustment part having an elastic part for elastically supporting the driving part with respect to the base, and allowing the driving part to move on the base in order to give tension to the wire, and a fixing part for fixing relative locations of the driving part to the base at a point at which the driving part has moved.

14 Claims, 5 Drawing Sheets

ROBOT DRIVING DEVICE

CROSS REFERENCE TO RELATED APPLICATION

The present application claims under 35 U.S.C. § 119(a) the benefit of Korean Patent Application No. 10-2020-0073826 filed on Jun. 17, 2020, the entire contents of which are incorporated by reference herein.

BACKGROUND

(a) Technical Field

The present disclosure relates to a robot driving device in which driving parts provide a driving force to joint parts, respectively, the driving parts being accommodated in a base, where each of the driving parts and the joint parts is connected by a wire, and each of the joint parts is driven by an adjustment part for adjusting the tension of the wire.

(b) Description of the Related Art

A robot may implement movements of the human body to handle various tasks, or may be worn by a person to help the person move. The purpose of a robot driving device is to naturally implement a joint motion so as to be as close as possible to the movement of the human body.

A conventional robot driving device is composed of a driving part coupled with a motor and a reducer, and a serial joint. The driving part for providing a driving force to the joint part immediately transfers the driving force to the joint part, and is located adjacent to the joint part for easy control.

However, the conventional robot driving device has a problem in that the driving part is located adjacent to the joint part, and thus the volume of the device is large compared to the limited size of the human body. There are also problems in that the driving part is provided for each of the joint locations, and thus it is difficult for a person to wear the robot. In addition, this arrangement may cause discomfort even if the person wears the robot, and the consumption of power supplied by the battery is high.

Due to the large volume of the device, it is difficult to match the center of motion of the human body, and there are limitations in that the motion speed is limited due to the weight of heavy equipment. Particularly, it is difficult to manufacture the robot due to the complicated structure, so that there is a problem in that the manufacturing cost increases. As described above, the conventional robot driving device has limitations in wearability of the human body and motion reproducibility.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a robot driving device, in which a driving part for providing a driving force to a joint part is accommodated in a base, and the driving part slides on the base to adjust the tension of a wire, thereby effectively transferring the driving force.

A robot driving device according to the present disclosure for achieving the object may include: a base provided at a point spaced apart from a joint part of a robot; a driving part installed to be movable on the base, and for providing a driving force to the joint part; a wire connecting the driving part and the joint part to transfer the driving force of the driving part to the joint part; an adjustment part having an elastic part for elastically supporting the driving part with respect to the base, and allowing the driving part to move on the base in order to give tension to the wire; and a fixing part for fixing relative locations of the driving part to the base at a point at which the driving part has slid.

The adjustment part may include: a first bolt screw-coupled to the adjustment part and inserted into the base, and a sliding location of the driving part may be adjusted according to a length of the first bolt inserted into the base.

The adjustment part may include: a cap connected to the driving part by the elastic part, and the first bolt is inserted into the base through the cap, and the cap may press the elastic part to allow the driving part to slide when the first bolt is inserted into the base.

The fixing part may penetrate the base to be inserted into the driving part and screw-coupled to the base and the driving part, and may include: a second bolt for fixing the driving part to the base when inserted into the driving part.

The robot driving device may further include: a housing having the driving part accommodated therein and provided with a plurality of through holes, in which the base may include: a third bolt inserted into the through hole of the housing, and the housing is slidably fixed to the base by the third bolt, so that the driving part slides without being separated from the base.

The robot driving device may further include: an encoder provided on the side of the driving part, and one side of the driving part is provided with a pulley around which the wire is wound.

The driving part may include a plurality of driving parts, and the joint part may include a plurality of joint parts, each of the driving parts being connected to a corresponding one of the joint parts by the wire to provide the driving force to the corresponding joint part.

The base may be configured to be located at a shoulder point of a wearer.

The joint part may be composed of a shoulder joint part, an elbow joint part, and a wrist joint part of a wearer, and each of the shoulder, elbow, and wrist joint parts may be independently driven.

Each of the driving parts may slide according to a separation distance between the driving part, the joint part, and the base to adjust tension when transferring power, thereby independently controlling the joint motion of the joint part.

The robot driving device may further include: a sheave provided between the driving part and the joint part to transfer power of the wire.

The wire may be connected by being surrounded by a Bowden cable at some points between the driving part and the joint part.

The driving part may be installed to slide in a direction closer to or farther away from the joint part on the base, and the fixing part may fix a location of the driving part at a point at which the driving part has slid.

Since the robot driving device according to the present disclosure is configured so that the driving part is accommodated in the base and thus there is no need to mount the driving part adjacent to each of the joint parts, the volume and weight of the robot driving device are reduced, thereby making it easy for the person to wear the robot.

In addition, the driving part may slide to adjust the tension of the wire, thereby effectively transferring the driving force and implementing the natural joint motion, and has a simple structure, thereby making it easy to manufacture the robot driving device.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
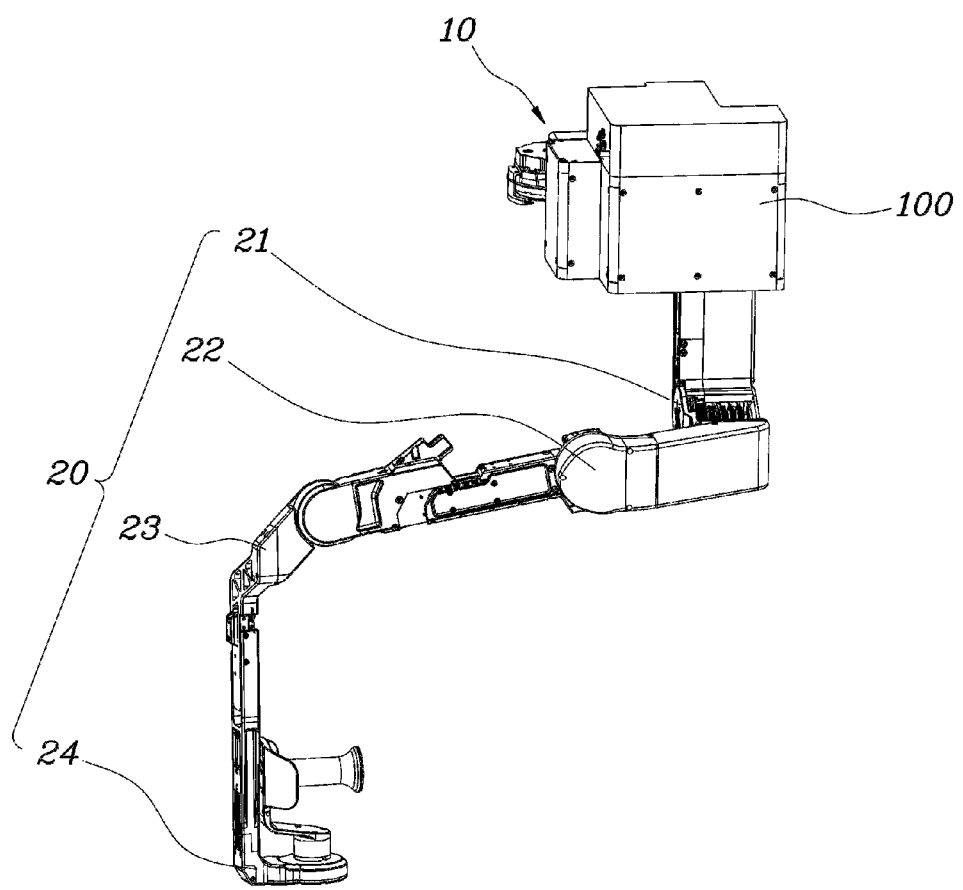
FIG. 1 is a perspective diagram illustrating a robot driving device according to an exemplary embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure may be embodied in various forms and it should not be construed that the present disclosure is limited to the exemplary embodiments described in the present specification or application.

Since the exemplary embodiments according to the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

Hereinafter, the present disclosure will be described in detail by explaining preferred exemplary embodiments of the present disclosure with reference to the accompanying drawings. The same reference numerals illustrated in each drawing denote the same members.

A robot device worn by a person to assist the motion of the human body is mainly used for a person with a physical discomfort by implementing the person's behavior. A general robot device has a joint part 20 for reproducing motion and a robot driving device 10 for providing power to the joint part 20 in which the joint part 20 and the robot driving device 10 are disposed adjacent to each other. This is because the power required for each joint may be transferred immediately and it is easy to manufacture the robot device.

However, there is a problem in that such a robot device has a large load, and in order to respond to the load, the overall mechanism specifications are increased, thereby causing an increase in volume and weight. In addition, it is difficult to match the motion of the human body and there is a limitation in motion speed due to a heavy weight. Accordingly, the conventional robot device has limitations in wearability and motion reproducibility.

The present disclosure relates to a robot driving device 10 in which a driving part 200 for providing a driving force to a joint part 20 is disposed separately from the joint part 20, the driving force required for the joint part 20 is transferred through a wire 300, and a gravity compensation mechanism is applied to assist the wear's behavior. As provided herein, the joint part 20 may include multiple individual joint parts.

Figure 2:
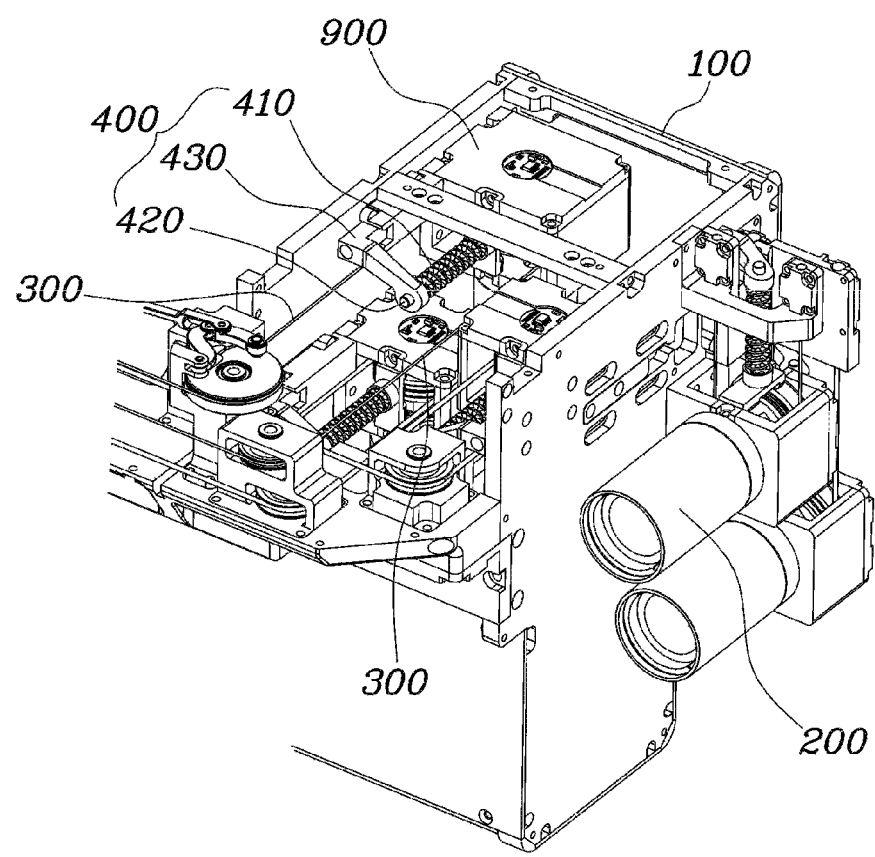
FIG. 2 is a perspective diagram of a base of the robot driving device according to the exemplary embodiment of the present disclosure.

FIG. 1 is a perspective diagram illustrating a robot driving device 10 according to an exemplary embodiment of the present disclosure, and FIG. 2 is a perspective diagram of a base 100 of the robot driving device 10 according to the exemplary embodiment of the present disclosure.

Referring to FIG. 1, the robot driving device 10 according to an exemplary embodiment of the present disclosure may have the base 100 located at a shoulder point of the wearer. The joint part 20 may be composed of shoulder joint parts 21, 22, an elbow joint part 23, and a wrist joint part 24 of the wearer. The driving part 200 for providing a driving force to each of the joint parts (of the joint part 20) may be provided, respectively to be accommodated in the base 100. That is, the driving part 200 is not installed adjacent to each of the joint parts, but the driving part 200 is accommodated in the base 100, and the base 100 and the joint part 20 are formed to be spaced apart from each other at regular intervals. Each joint part 20 may be driven independently by the corresponding driving part 200.

Referring to FIGS. 1 and 2, the robot driving device 10 according to the exemplary embodiment of the present disclosure may include the base 100, the driving part 200, the wire 300, an adjustment part 400, and a fixing part 500.

The base 100 is a device in which the driving part 200 for providing the driving force to the joint part 20 of the robot is embedded. The base 100 is provided at a point spaced apart from the joint part 20 of the robot. A corresponding driving part 200 is provided for each of the joint parts 20 and the driving part 200 is not located adjacent to the joint part 20, but the driving part 200 may be provided to be spaced apart from the joint part 20 and located to be collected in the base 100.

The driving part 200 is a device for providing the driving force to the joint part 20. The driving part 200 may be a motor. The driving part 200 may be installed to be movable on the base 100. In the moving manner, the driving part 200 may be installed to slide in a direction closer to or farther away from the joint part 20. The driving part 200 slides to adjust the tension of the wire 300 for transferring the driving force, thereby effectively transferring the driving force.

The wire 300 may connect the driving part 200 and the joint part 20 to transfer the driving force of the driving part 200 to the joint part 20. The wire 300 preferably is formed in a ring shape and thus may be connected in a form in which one side is wound around the driving part 200 and the other side is wound around the joint part 20. Accordingly, the length of the wire 300 may be determined according to a separation distance between the driving part 200 and the joint part 20.

When the driving part 200 is driven to implement joint motion, the wire 300 moves, and the joint part 20 wound around the other side of the wire 300 may rotate. Since the tension of the wire 300 may be changed according to the type and displacement of the motion implemented by the joint part 20, the tension is adjusted by the sliding of the driving part 200.

The adjustment part 400 may serve to adjust the tension of the wire 300. The adjustment part 400 is connected by the driving part 200 and an elastic part 410. The elastic part 410 may be configured to elastically support the driving part 200 in a direction away from the base 100. The driving part 200 may slide on the base 100 to give tension to the wire 300. According to the joint motion implemented by the joint part 20, the adjustment part 400 may appropriately adjust the tension of the wire 300, so that an effective motion may be implemented so that the wearer does not feel uncomfortable.

The fixing part 500 may serve to fix the location of the driving part 200 on the base 100. The relative locations of the driving part 200 and the base 100 may be fixed at a point at which the driving part 200 has moved to fix the driving part 200 not to slide. The fixing part 500 is preferably located on the opposite side of the adjustment part 400 in order to effectively perform the fixing function.

Figure 3:
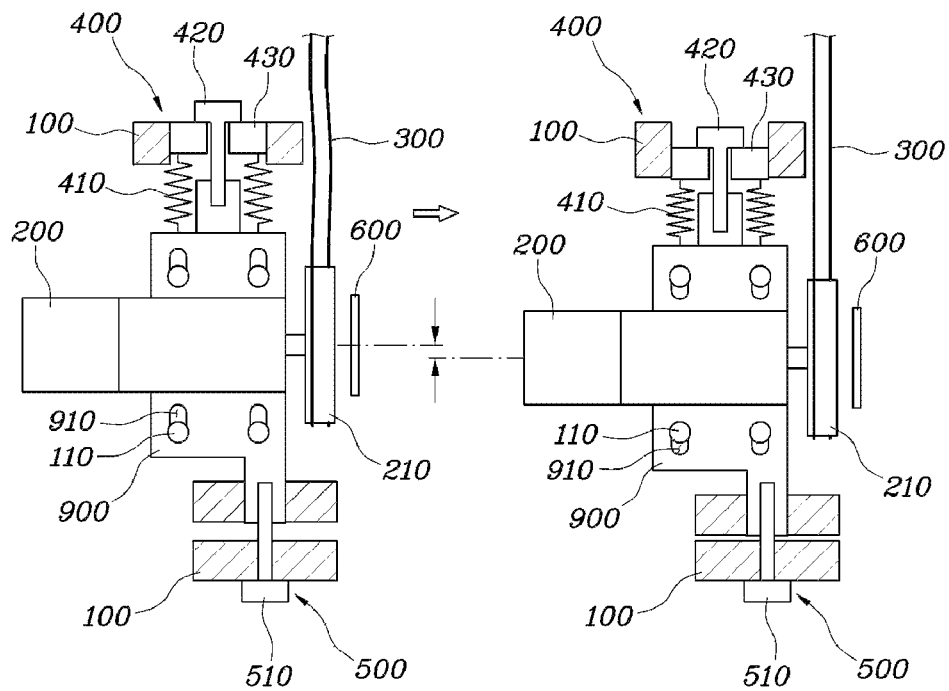
FIG. 3 is a diagram illustrating a state where the robot driving device according to the exemplary embodiment of the present disclosure is operated.

FIG. 3 is a diagram illustrating a state where the robot driving device 10 according to the exemplary embodiment of the present disclosure is operated. A principle of the operation of the robot driving device 10 according to the exemplary embodiment of the present disclosure will be described with reference to FIG. 3 as follows.

Referring to FIG. 3, the adjustment part 400 of the robot driving device 10 according to the exemplary embodiment of the present disclosure may include a first bolt 420 screw-coupled to the adjustment part 400 and inserted into the base 100. When the first bolt 420 is inserted into the base 100, the elastic part 410 contracts and the driving part 200 may slide. That is, a distance between the adjustment part 400 and the driving part 200 is getting closer. The relative location of the driving part 200 may be changed by adjusting the length of the first bolt 420 inserted into the base 100.

The length of the elastic part 410 is adjusted according to the length of the first bolt 420 inserted into the base 100, and as a result, the location at which the driving part 200 slides may be adjusted. A pulley 210 around which the wire 300 is wound may be provided on one side of the driving part 200. When the driving part 200 slides and the location thereof is changed, the tension of the wire 300 may be adjusted by the pulley 210 pulling or releasing the wire 300.

In addition, as illustrated in FIG. 3, the adjustment part 400 may include a cap 430. The cap 430 is connected to the driving part 200 by the elastic part 410. The first bolt 420 may penetrate the cap 430 and be inserted into the base 100. When the first bolt 420 is inserted into the base 100, the cap 430 may press the elastic part 410 to cause the driving part 200 to slide. By adjusting the insertion length of the first bolt 420 to adjust the force pressing the elastic part 410 by the cap 430, the driving part 200 may slide.

In the case of transferring the driving force in order to implement the joint motion, the tension of the wire 300 may be changed according to the motion type or displacement of the joint part 20. In order to effectively transfer the driving force, the tension of the wire 300 may be adjusted, and in order to adjust the tension, the cap 430 may press the elastic part 410 while the first bolt 420 is tightened. The length of the first bolt 420 inserted into the base 100 becomes longer while the first bolt 420 is tightened, and the cap 430 connected to the first bolt 420 moves in a direction close to the driving part 200.

Due to the movement of the cap 430, the elastic part 410 pushes the driving part 200, so that the driving part 200 may slide. When the driving part 200 is fixed on the base 100 by the fixing part 500 in a sliding state, the tension of the wire 300 connected to the driving part 200 may be adjusted.

The fixing part 500 may include a second bolt 510. The second bolt 510 may penetrate the base 100 and be inserted into the driving part 200. In addition, the second bolt 510 may be screw-coupled to the base 100 and the driving part 200. When the second bolt 510 is inserted into the driving part 200, the driving part 200 may be fixed on the base 100.

Referring to FIG. 3, the robot driving device 10 according to the exemplary embodiment of the present disclosure may further include a housing 900. The housing 900 may accommodate at least one driving part 200 therein. The housing 900 may be provided with a plurality of through holes 910 formed therethrough, and a third bolt 110 provided on the base 100 may be inserted into the through hole 910. The upper portion of the third bolt 110 is formed to be larger than the width of the through hole 910 to fix the housing 900 not to deviate from the base 100. Accordingly, the housing 900 may be slidably fixed to the base 100 by the third bolt 110, so that the driving part 200 may slide without being separated from the base 100.

An encoder 600 may be provided on the side of the driving part 200. The encoder 600 may control the joint motion by outputting the rotation speed and rotation amount of the driving part 200 as electrical signals.

The base 100 may include a plurality of driving parts 200. Each driving part 200 is connected to each of the joint parts 20 corresponding thereto through the wire 300. Accordingly, the driving part 200 provides a driving force to the corresponding joint part 20, and does not interfere with the movement of the other joint parts 20.

If the robot driving device 10 according to the exemplary embodiment of the present disclosure implements an upper limb motion, the base 100 may be configured to be located at a shoulder point of the wearer. This is because the wearer's shoulder is the highest place on an upper body of the person other than the wearer's head, thereby facilitating the connection with each of the joint parts 20.

Each of the driving parts 200 may slide according to the separation distance between the joint part 20 and the base 100 to adjust tension when transferring power to the joint part 20. If the base 100 is located at the shoulder point, the shoulder joint part 21 is formed closest to the base 100, and the wrist joint part 20 is formed farthest from the base 100. According to the relative location of the base 100 and the joint part 20, the driving part 200 may slide to adjust tension, thereby independently controlling the joint motion.

Figure 4:
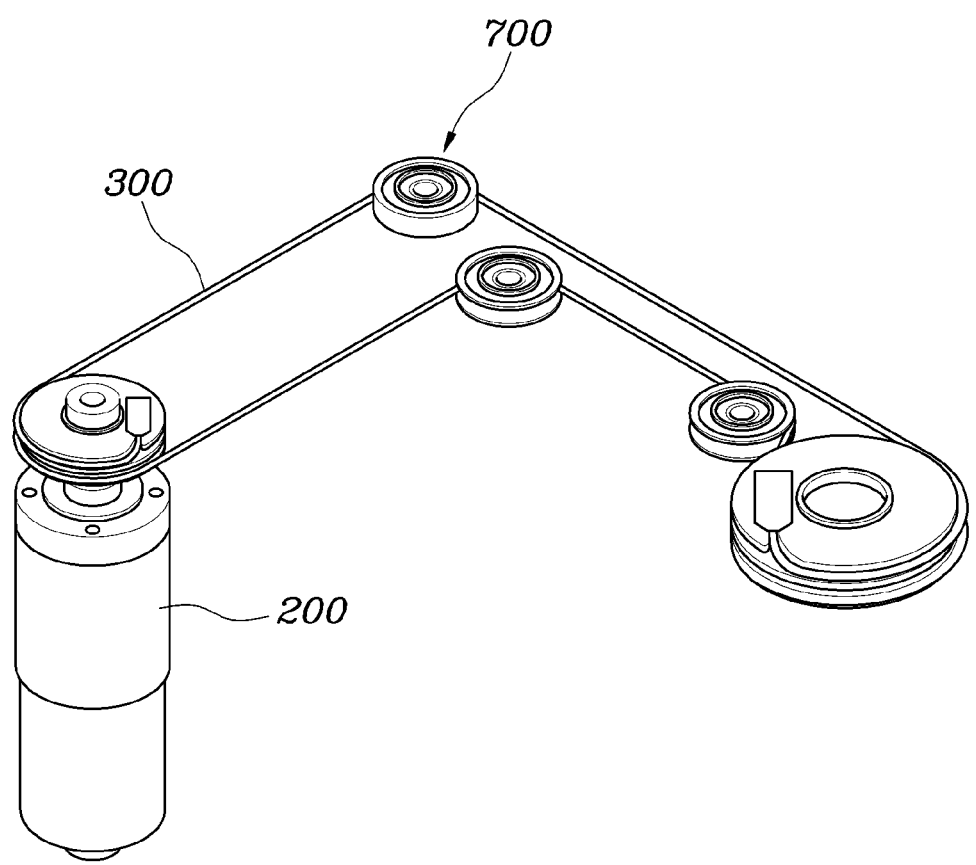
FIG. 4 is a diagram illustrating a state where a sheave is provided in the robot driving device according to the exemplary embodiment of the present disclosure.

FIG. 4 is a diagram illustrating a state where a sheave 700 is provided in the robot driving device 10 according to the exemplary embodiment of the present disclosure.

Referring to FIG. 4, the robot driving device 10 according to the exemplary embodiment of the present disclosure may further include the sheave 700. The sheave 700 may be provided on a path of the wire 300 to serve to transfer the power of the wire 300. The number of sheaves 700 may be variably configured according to the separation locations of the driving part 200 and the joint part 20.

Figure 5:
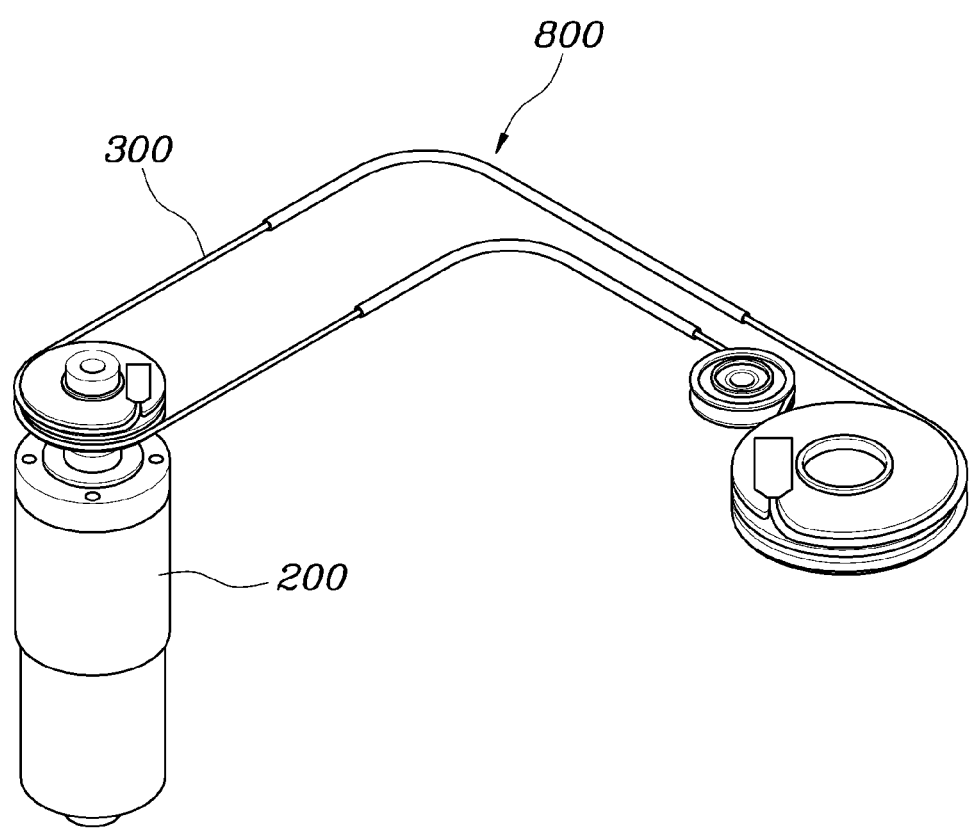
FIG. 5 is a diagram illustrating a state where a Bowden cable is provided on a wire of the robot driving device according to the exemplary embodiment of the present disclosure.

FIG. 5 is a diagram illustrating a state where a Bowen 800 is provided on the wire 300 of the robot driving device 10 according to the exemplary embodiment of the present disclosure.

Referring to FIG. 5, the wire 300 of the robot driving device 10 according to the exemplary embodiment of the present disclosure may be connected by being surrounded by the Bowden cable 800 at some points. Accordingly, if a power part and the joint part 20 are spaced apart from each other, the power of the wire 300 may be effectively transferred.

Although the present disclosure has been illustrated and described in relation to specific exemplary embodiments, it is apparent to those skilled in the art that the present disclosure may be variously improved and changed without departing from the technical spirit of the present disclosure provided by the appended claims.

What is claimed is:

1. A robot driving device comprising:
    a base provided at a point spaced apart from a joint part of a robot;
    a driving part for providing a driving force to the joint part;
    a wire connecting the driving part and the joint part to transfer the driving force of the driving part to the joint part;
    an adjustment part having an elastic part for elastically supporting the driving part with respect to the base, and allowing the driving part to move on the base; and
    a fixing part for fixing the driving part to the base at a point at which the driving part has moved.

2. The robot driving device according to claim 1, wherein the adjustment part comprises:
    a first bolt screw-coupled to the adjustment part and inserted into the base, wherein a sliding location of the driving part is adjusted according to a length of the first bolt inserted into the base.

3. The robot driving device according to claim 2, wherein the adjustment part comprises:
    a cap connected to the driving part by the elastic part, wherein the first bolt is inserted into the base through the cap, and the cap presses the elastic part to allow the driving part to slide when the first bolt is inserted into the base.

4. The robot driving device according to claim 1, wherein the fixing part penetrates the base to be inserted into the driving part and screw-coupled to the base and the driving part, the fixing part comprising:
    a second bolt for fixing the driving part to the base when inserted into the driving part.

5. The robot driving device according to claim 1, further comprising:
    a housing having the driving part accommodated therein and provided with a plurality of through holes,
    wherein the base comprises a third bolt inserted into the through hole of the housing, and
    wherein the housing is slidably fixed to the base by the third bolt, so that the driving part slides without being separated from the base.

6. The robot driving device according to claim 1, further comprising:
    an encoder provided on a side of the driving part.

7. The robot driving device according to claim 1, wherein one side of the driving part is provided with a pulley around which the wire is wound.

8. The robot driving device according to claim 1, wherein the driving part comprises a plurality of driving parts, and the joint part comprises a plurality of joint parts, each of the driving parts being connected to a corresponding one of the joint parts by the wire to provide the driving force to the corresponding joint part.

9. The robot driving device according to claim 1, wherein the base is configured to be located at a shoulder point of a wearer.

10. The robot driving device according to claim 1, wherein the joint part is composed of a shoulder joint part, an elbow joint part, and a wrist joint part of a wearer, and each of the shoulder, elbow, and wrist joint parts is independently driven.

11. The robot driving device according to claim 1, wherein the driving part slides according to a separation distance between the driving part, the joint part, and the base to adjust tension when transferring power, thereby independently controlling the joint motion of the joint part.

12. The robot driving device according to claim 1, further comprising:
    a sheave provided between the driving part and the joint part to transfer power of the wire.

13. The robot driving device according to claim 1, wherein the wire is connected by being surrounded by a Bowden cable at some points between the driving part and the joint part.

14. The robot driving device according to claim 1, wherein the driving part is installed to slide in a direction closer to or farther away from the joint part on the base, and the fixing part fixes a location of the driving part at a point at which the driving part has slid.

\* \* \* \* \*